US011180592B2

(12) United States Patent
Chernysheva et al.

(10) Patent No.: US 11,180,592 B2
(45) Date of Patent: Nov. 23, 2021

(54) METHOD FOR MANUFACTURING PARTIALLY FLUORINATED POLYMERS

(71) Applicant: SOLVAY SPECIALTY POLYMERS ITALY S.P.A., Bollate (IT)

(72) Inventors: Liubov Chernysheva, Milan (IT); Serena Carella, Parabiago (IT); Matteo Fantoni, Vanzaghello (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 0 days.

(21) Appl. No.: 16/627,752

(22) PCT Filed: Jun. 25, 2018

(86) PCT No.: PCT/EP2018/066901
§ 371 (c)(1),
(2) Date: Dec. 30, 2019

(87) PCT Pub. No.: WO2019/002180
PCT Pub. Date: Jan. 3, 2019

(65) Prior Publication Data
US 2020/0123293 A1    Apr. 23, 2020

(30) Foreign Application Priority Data
Jun. 30, 2017    (EP) .................................... 17178921

(51) Int. Cl.
| | | |
|---|---|---|
| *C08F 214/22* | (2006.01) |
| *C08F 14/22* | (2006.01) |
| *C08F 2/24* | (2006.01) |
| *C08F 4/40* | (2006.01) |
| *C08F 114/20* | (2006.01) |
| *C08F 214/18* | (2006.01) |
| *C08F 214/24* | (2006.01) |
| *C08F 214/26* | (2006.01) |
| *C08F 214/28* | (2006.01) |
| *C08K 5/14* | (2006.01) |
| *C08K 5/42* | (2006.01) |
| *C08K 5/58* | (2006.01) |

(52) U.S. Cl.
CPC ............ *C08F 214/222* (2013.01); *C08F 2/24* (2013.01); *C08F 4/40* (2013.01); *C08F 114/20* (2013.01); *C08F 214/182* (2013.01); *C08F 214/242* (2013.01); *C08F 214/262* (2013.01); *C08F 214/282* (2013.01); *C08K 5/14* (2013.01); *C08K 5/42* (2013.01); *C08K 5/58* (2013.01)

(58) Field of Classification Search
CPC ...... C08F 14/22; C08F 114/22; C08F 214/22; C08F 2/22
See application file for complete search history.

(56) References Cited

U.S. PATENT DOCUMENTS

| | | | |
|---|---|---|---|
| 2,435,537 A * | 2/1948 | Ford ......................... | C08F 2/16 526/229 |
| 3,752,787 A | 8/1973 | De Brunner | |
| 3,876,654 A | 4/1975 | Pattison | |
| 4,035,565 A | 7/1977 | Apotheker et al. | |
| 4,243,770 A | 1/1981 | Tatemoto et al. | |
| 4,259,469 A | 3/1981 | Wilson et al. | |
| 4,281,092 A | 7/1981 | Breazeale | |
| 4,564,662 A | 1/1986 | Albin | |
| 4,694,045 A | 9/1987 | Moore | |
| 4,745,165 A | 5/1988 | Arcella et al. | |
| 4,943,622 A | 7/1990 | Naraki et al. | |
| 5,173,553 A | 12/1992 | Albano et al. | |
| 5,285,002 A * | 2/1994 | Grootaert ................ | C08F 14/18 526/222 |
| 5,447,993 A | 9/1995 | Logothetis | |
| 5,639,837 A * | 6/1997 | Farnham ................. | C08F 14/18 526/222 |
| 5,789,489 A | 8/1998 | Coughlin et al. | |
| 5,852,125 A * | 12/1998 | Kruger .................... | C08F 14/22 525/326.2 |
| 7,122,608 B1 | 10/2006 | Brinati et al. | |
| 10,150,820 B2 * | 12/2018 | Iida ......................... | C08F 14/22 |
| 2002/0042353 A1 | 4/2002 | Berghofer et al. | |
| 2006/0089611 A1 | 4/2006 | Herfert et al. | |
| 2006/0229369 A1 | 10/2006 | Frank et al. | |
| 2009/0124755 A1* | 5/2009 | Coughlin ............ | C08F 214/262 524/746 |
| 2015/0337157 A1 | 11/2015 | Iida et al. | |
| 2017/0152332 A1* | 6/2017 | Aida ....................... | F16L 11/12 |
| 2020/0102411 A1* | 4/2020 | Hattori .................. | C08F 214/22 |

FOREIGN PATENT DOCUMENTS

| | | |
|---|---|---|
| EP | 120462 A1 | 10/1984 |
| EP | 182299 A2 | 5/1986 |
| EP | 0199138 A2 | 10/1986 |
| EP | 335705 A1 | 10/1989 |
| WO | 2009062006 A1 | 5/2009 |

(Continued)

OTHER PUBLICATIONS

Rothmann, H. et al., "Completely New Sulfinic Acid Derivative as a Reducing Agent in Redox Initiation Systems for Emulsion Polymerizations", Proceedings of the Twenty-Eighth International Waterborne, High-Solids, and Powder Coatings Symposium, Feb. 21-23, 2001, New Orleans, Louisiana, USA, pp. 465-479.

*Primary Examiner* — Rip A Lee
(74) *Attorney, Agent, or Firm* — Osha Bergman Watanabe & Burton LLP

(57) ABSTRACT

The present invention relates to a method for manufacturing of partially fluorinated polymers, notably vinylidene fluoride (VDF)-based polymers, in emulsion polymerization, and to a polymer obtained from said method.

15 Claims, No Drawings

(56) References Cited

FOREIGN PATENT DOCUMENTS

WO     2012083107 A2    6/2012
WO     2013016372 A1    1/2013

\* cited by examiner

METHOD FOR MANUFACTURING PARTIALLY FLUORINATED POLYMERS

CROSS-REFERENCE TO RELATED APPLICATIONS

This application is a U.S. national stage entry under 35 U.S.C. § 371 of International Application No. PCT/EP2018/066901 filed Jun. 25, 2018, which claims priority to European application No. 17178921.7, filed on Jun. 30, 2017. The entire contents of these applications are explicitly incorporated herein by this reference.

TECHNICAL FIELD

The present invention relates to a method for manufacturing of partially fluorinated polymers, notably vinylidene fluoride (VDF)-based polymers, in emulsion polymerization, and to a polymer obtained from said method.

BACKGROUND ART

Fluoropolymers based on vinylidene fluoride (also referred to as 1,1-difluoroethylene or VDF) comprise both elastomers and thermoplastic polymers, which are used in several technical fields, due to their properties of outstanding chemical and heat resistance, notably in harsh working conditions.

Typically, VDF-based polymers are produced via emulsion polymerization processes, by reacting a water-soluble polymerization initiator in the presence of the fluorinated monomers and of at least one surfactant (also referred to as emulsifier).

US 2002/0042353 (L. BRUGGEMANN KG) discloses sulfinic acid compounds of formula (I): MO—S(=O)—C(R1)(R2)(R3), which can be used as reducing agent component for textile printing, in textile bleaching or vat dyeing or a reducing bleach for mineral refining or fibre finishing; or as co-catalyst in emulsion polymerization or redox catalyst system in plastic production. In the example, a compound of formula (I) is used as co-catalyst to replace ammonium isoascorbate/isoascorbic acid in emulsion polymerization of ethylene and vinyl acetate in the presence of Fe(II) sulfate and aqueous hydrogen peroxide as oxidizing agents.

Sulfinic acid compounds have been disclosed in the art as reducing agents in processed conducted in gel-polymerization for the synthesis of superabsorbent polymers (for example, US 2006/0089611 (BASF AKTIENGESELLSCHAFT), in inverse emulsion polymerization for the synthesis of free-radically polymerizable water-soluble and/or water-dispersible monomers (for example, US 2006/0229369 (BASF AKTIENGESELLSCHAFT)).

The Applicant is not aware of any patent or literature document published to date, which discloses or suggests the use of sulfinic acid compounds as reducing agents for the synthesis of fluoropolymers.

SUMMARY OF INVENTION

The Applicant is well aware that processing, morphology, properties, and end-use performances are affected by branching, crosslinking, differences in the content of defect of structures, and other chain irregularities of the VDF-based polymers.

The Applicant is also aware that emulsion polymerization processes typically lead to VDF-based polymers with a high number of branching, compared for example to processes performed in suspension polymerization.

Thus, the Applicant faced the problem of providing a VDF-based polymer that can be readily manufactured via emulsion polymerization and that is characterized by a reduced number of branching in its polymeric chain.

Surprisingly, the Applicant found that the said technical problem can be solved by conducting an emulsion polymerization process comprising the reaction of at least one unsaturated fluorinated monomer in the presence of a redox-initiating system comprising at least one organic peroxide and at least one compound bearing a sulfinic acid group.

Thus, in a first aspect, the present invention relates to a method for the synthesis of a partially fluorinated polymer [polymer (P)] comprising recurring units derived from 1,1-difluoroethylene, said method comprising polymerizing 1,1-difluoroethylene, optionally in the presence of at least one further (per)fluorinated monomer [monomer (MF)], in an aqueous emulsion in the presence of a redox-initiating system [system (R)] comprising at least one organic radical initiator and at least one composition [composition (CS)] comprising at least one compound [compound (S)] bearing at least one sulfinic acid group.

The Applicant surprisingly found that the method according to the present invention allows to manufacture a VDF-based polymer characterized by a low number of branching in its polymeric chain when compared to VDF-based polymers manufactured via the methods known in the art.

Advantageously, the VDF-based polymer obtained via the method according to the present invention is characterized by an improved thermal stability compared to the VDF-based polymers prepared via the methods known in the art. Without being bound by any theory, this is believed to be due to the low number of hydrogenated chain ends (such as those of formula $-CF_2H$, $-CF_2CH_3$, $-CH_2CH_3$ and $-C(CH_3)_3$), which negatively affect the stability of the final VDF-based polymer.

Thus, in a second aspect, the present invention relates to a partially fluorinated polymer [polymer (P)] comprising recurring units derived from 1,1-difluoroethylene, and optionally recurring units derived from at least one further (per)fluorinated monomer [monomer (MF)], said polymer (P) being advantageously obtained via the above mentioned method.

In a third aspect, the present invention relates to the use of a compound [compound (S)] bearing a sulfinic acid group as redox-initiating system in a polymerization reaction of at least 1,1-difluoroethylene, optionally in the presence of at least one further (per)fluorinated monomer [monomer (MF)].

DESCRIPTION OF EMBODIMENTS

For the purposes of the present description and of the following claims:

the use of parentheses around symbols or numbers identifying the formulae, for example in expressions like "polymer (P)", etc., has the mere purpose of better distinguishing the symbol or number from the rest of the text and, hence, said parenthesis can also be omitted;

the expression "essentially consists of" is intended to indicate that minor amounts of end chains, defects, irregularities and monomer rearrangements are tolerated in polymer (P), provided that their amount is below 5 moles % based on the total moles of the final polymer (P), more preferably below 2 moles %;

the terms "1,1-difluoroethylene", "1,1-difluoroethene" and "vinylidene fluoride" are used as synonyms;

the terms "poly-(1,1-difluoroethylene)" and "polyvinylidene fluoride" are used as synonyms;

the term "fluoroelastomer" is intended to indicate amorphous polymer(s), preferably having a low degree of crystallinity (crystalline phase less than 20% by volume) and a glass transition temperature (Tg) below room temperature. The fluoroelastomer has advantageously a Tg below 10° C., preferably below 5° C., more preferably 0° C.;

the expression "polymer (P) comprising recurring units derived from 1,1-difluoroethylene" is intended to indicate that polymer (P) is obtained by reacting together at least 1,1-difluoroethylene monomers, optionally in the presence of at least one further monomer (MF), via a suitable reaction.

According to a first preferred embodiment, said polymer (P) is a homo-polymer of VDF [polymer ($P_H$)], i.e., it essentially consists of recurring units derived from vinylidene fluoride (also referred to as 1,1-difluoroethylene).

According to another preferred embodiment, said polymer (P) is a copolymer of VDF [polymer ($P_C$)], i.e. it comprises recurring units derived from vinylidene fluoride (also referred to as 1,1-difluoroethylene) and recurring units derived from at least one further (per)fluorinated monomer [monomer (MF)].

Preferably, said polymer ($P_C$) comprises at least 15% moles, more preferably at least 20% moles, and even more preferably at least 35% moles, of recurring units derived from VDF with respect to all recurring units of said polymer ($P_C$).

Preferably, said polymer ($P_C$) comprises at most 85% moles, more preferably at most 80% moles, even more preferably at most 78% moles, of recurring units derived from VDF with respect to all recurring units of said polymer ($P_C$).

Non limitative examples of suitable monomers ($M_F$) are notably:

(a) $C_2$-$C_8$ perfluoroolefins, such as tetrafluoroethylene (TFE) and hexafluoropropylene (HFP);

(b) hydrogen-containing $C_2$-$C_8$ olefins different from VDF, such as vinyl fluoride (VF), trifluoroethylene (TrFE), perfluoroalkyl ethylenes of formula $CH_2$=CH—$R_f$, wherein $R_f$ is a $C_1$-$C_6$ perfluoroalkyl group;

(c) $C_2$-$C_8$ chloro and/or bromo and/or iodo-fluoroolefins such as chlorotrifluoroethylene (CTFE);

(d) (per)fluoroalkylvinylethers (PAVE) of formula $CF_2$=CFOR$_f$, wherein $R_f$ is a $C_1$-$C_6$ (per)fluoroalkyl group, e.g. —$CF_3$, —$C_2F_5$, —$C_3F_7$;

(e) (per)fluoro-oxy-alkylvinylethers of formula $CF_2$=CFOX, wherein X is a $C_1$-$C_{12}$ [(per)fluoro]-oxyalkyl comprising catenary oxygen atoms, e.g. the perfluoro-2-propoxypropyl group;

(f) (per)fluorodioxoles having formula:

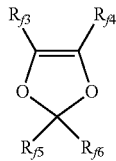

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably —$CF_3$, —$C_2F_5$, —$C_3F_7$, —$OCF_3$, —$OCF_2CF_2OCF_3$; preferably, perfluorodioxoles;

(g) (per)fluoro-methoxy-vinylethers (MOVE, hereinafter) having formula: $CFX_2$=$CX_2OCF_2OR"_f$, wherein $R"_f$ is selected among linear or branched $C_1$-$C_6$ (per)fluoroalkyls; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$=F, H; preferably $X_2$ is F and $R"_f$ is —$CF_2CF_3$ (MOVE1); —$CF_2CF_2OCF_3$ (MOVE2); or —$CF_3$ (MOVE3).

It is generally preferred that said polymer ($P_C$) comprises, in addition to recurring units derived from VDF, recurring units derived from HFP.

In this case, polymer ($P_C$) typically comprises at least 10% moles, preferably at least 12% moles, more preferably at least 15% moles of recurring units derived from HFP, with respect to all recurring units of the polymer ($P_C$).

Still, polymer ($P_C$) typically comprises at most 45% moles, preferably at most 40% moles, more preferably at most 35% moles of recurring units derived from HFP, with respect to all recurring units of the polymer ($P_C$).

Polymers ($P_C$) may comprise, in addition to recurring units derived from VDF and HFP, one or more of the followings:

recurring units derived from at least one bis-olefin [bis-olefin (OF)] having general formula:

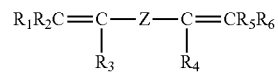

wherein $R_1$, $R_2$, $R_3$, $R_4$, $R_5$ and $R_6$, equal or different from each other, are H, a halogen, or a $C_1$-$C_5$ optionally halogenated group, possibly comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical;

recurring units derived from at least one (per)fluorinated monomer different from VDF and HFP; and recurring units derived from at least one hydrogenated monomer.

Examples of hydrogenated monomers are notably non-fluorinated alpha-olefins, including ethylene, propylene, 1-butene, diene monomers, styrene monomers, alpha-olefins being typically used. $C_2$-$C_8$ non-fluorinated alpha-olefins (OI), and more particularly ethylene and propylene, will be selected for achieving increased resistance to bases.

The bis-olefin (OF) is preferably selected from the group consisting of those complying with formulae (OF-1), (OF-2) and (OF-3):

(OF-1)

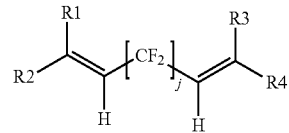

wherein j is an integer between 2 and 10, preferably between 4 and 8, and $R_1$, $R_2$, $R_3$, $R_4$, equal or different from each other, are H, F or $C_{1-5}$ alkyl or (per)fluoroalkyl group;
(OF-2)

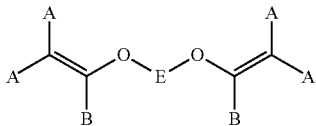

wherein
each of A, equal or different from each other and at each occurrence, is independently selected from F, Cl, and H;
each of B, equal or different from each other and at each occurrence, is independently selected from F, Cl, H and $OR_B$, wherein $R_B$ is a branched or straight alkyl chain, which can be partially, substantially or completely fluorinated or chlorinated;
E is a divalent group having 2 to 10 carbon atom, optionally fluorinated, which may be inserted with ether linkages; preferably E is a —$(CF_2)_m$— group, with m being an integer from 3 to 5;
a preferred bis-olefin of (OF-2) type is $F_2C=CF—O—(CF_2)_5—O—CF=CF_2$.
(OF-3)

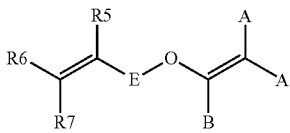

wherein E, A and B have the same meaning as above defined; $R_5$, $R_6$, $R_7$, equal or different from each other, are H, F or $C_{1-5}$ alkyl or (per)fluoroalkyl group.

When a bis-olefin is employed, the resulting polymer ($P_C$) typically comprises from 0.01% to 5% by moles of units deriving from the bis-olefin with respect to the total amount of units of said polymer ($P_C$).

Optionally, said polymer ($P_C$) may comprise cure sites, either as pendant groups bonded to certain recurring units or as ends groups of the polymer chain, said cure sites comprising at least one iodine or bromine atom, more preferably at least one iodine atom.

Among cure-site containing recurring units, mention can be notably made of: (CSM-1) iodine or bromine containing monomers of formula:

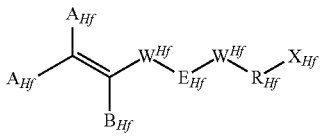

wherein each of $A_{Hf}$, equal to or different from each other and at each occurrence, is independently selected from F, Cl, and H; $B_{Hf}$ is any of F, Cl, H and $OR^{HF}_B$, wherein $R^{HF}_B$ is a branched or straight chain alkyl radical which can be partially, substantially or completely fluorinated or chlorinated; each of $W^{Hf}$ equal to or different from each other and at each occurrence, is independently a covalent bond or an oxygen atom; $E_{Hf}$ is a divalent group having 2 to 10 carbon atom, optionally fluorinated; $R_{Hf}$ is a branched or straight chain alkyl radical, which can be partially, substantially or completely fluorinated; and $R_{Hf}$ is a halogen atom selected from the group consisting of Iodine and Bromine; which may be inserted with ether linkages; preferably E is a —$(CF_2)_m$— group, with m being an integer from 3 to 5;
(CSM-2) ethylenically unsaturated compounds comprising cyanide groups, possibly fluorinated.

Among cure-site containing monomers of type (CSM1), preferred monomers are those selected from the group consisting of: (CSM1-A) iodine-containing perfluorovinylethers of formula:

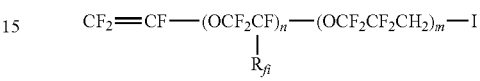

with m being an integer from 0 to 5 and n being an integer from 0 to 3, with the provision that at least one of m and n is different from 0, and $R_{fi}$ being F or $CF_3$; (as notably described in U.S. Pat. No. 4,745,165 (AUSIMONT S.P.A), U.S. Pat. No. 4,564,662 (MINNESOTA MINING) and EP 199138 A (DAIKIN IND. LTD.); and (CSM-1B) iodine-containing ethylenically unsaturated compounds of formula:

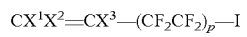

wherein each of $X^1$, $X^2$ and $X^3$, equal to or different from each other, are independently H or F; and p is an integer from 1 to 5; among these compounds, mention can be made of $CH_2=CHCF_2CF_2I$, $I(CF_2CF_2)_2CH=CH_2$, $ICF_2CF_2CF=CH_2$, $I(CF_2CF_2)_2CF=CH_2$;
(CSM-1C) iodine-containing ethylenically unsaturated compounds of formula:

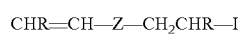

wherein R is H or $CH_3$, Z is a $C_1$-$C_{18}$ (per)fluoroalkylene radical, linear or branched, optionally containing one or more ether oxygen atoms, or a (per)fluoropolyoxyalkylene radical; among these compounds, mention can be made of $CH_2=CH—(CF_2)_4CH_2CH_2I$, $CH_2=CH—(CF_2)_6CH_2CH_2I$, $CH_2=CH—(CF_2)_8CH_2CH_2I$, $CH_2=CH—(CF_2)_2CH_2CH_2I$;
(CSM-1D) bromo and/or iodo alpha-olefins containing from 2 to 10 carbon atoms such as bromotrifluoroethylene or bromotetrafluorobutene described, for example, in U.S. Pat. No. 4,035,565 (DU PONT) or other compounds bromo and/or iodo alpha-olefins disclosed in U.S. Pat. No. 4,694,045 DU PONT).

Among cure-site containing monomers of type (CSM2), preferred monomers are those selected from the group consisting of:
(CSM2-A) perfluorovinyl ethers containing cyanide groups of formula 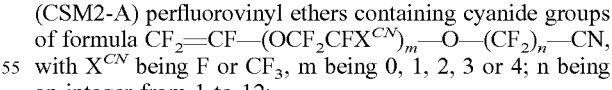, with $X^{CN}$ being F or $CF_3$, m being 0, 1, 2, 3 or 4; n being an integer from 1 to 12;
(CSM2-B) perfluorovinyl ethers containing cyanide groups of formula 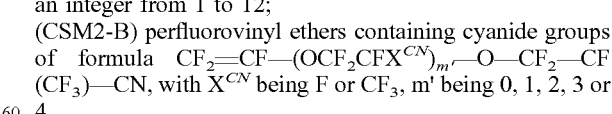, with $X^{CN}$ being F or $CF_3$, m' being 0, 1, 2, 3 or 4.

Specific examples of cure-site containing monomers of type CSM2-A and CSM2-B suitable to the purposes of the present invention are notably those described in U.S. Pat. No. 4,281,092 (DU PONT), U.S. Pat. No. 5,447,993 (DU PONT) and U.S. Pat. No. 5,789,489 (DU PONT).

Preferably, said polymer ($P_C$) comprises iodine or bromine cure sites in an amount of 0.001 to 10 wt. %. Among these, iodine cure sites are those selected for maximizing curing rate, so that (per)fluoroelastomers comprising iodine cure-sites are preferred.

According to this embodiment, for ensuring acceptable reactivity it is generally understood that the content of iodine and/or bromine in the polymer ($P_C$) should be of at least 0.05 wt. %, preferably of at least 0.1 wt. %, more preferably of at least 0.15 wt. %, with respect to the total weight of said polymer ($P_C$).

On the other side, amounts of iodine and/or bromine not exceeding preferably 7% wt., more specifically not exceeding 5% wt., or even not exceeding 4% wt., with respect to the total weight of the said polymer ($P_C$), are those generally selected for avoiding side reactions and/or detrimental effects on thermal stability.

These iodine or bromine cure sites of these preferred embodiments of the invention might be comprised as pending groups bound to the backbone of polymer ($P_C$) (by means of incorporation in the polymer chain of recurring units derived from monomers of (CSM-1) type, as above described, and preferably of monomers of (CSM-1A) to (CSM1-D), as above detailed) or might be comprised as terminal groups of said polymer chain.

According to a first embodiment, the iodine and/or bromine cure sites are comprised as pending groups bound to the backbone of the polymer ($P_C$) chain. The polymers ($P_C$) according to this embodiment generally comprise recurring units derived from iodine or bromine containing monomers (CSM-1) in amounts of 0.05 to 5 mol per 100 mol of all other recurring units of the (per)fluoroelastomer, so as to advantageously ensure above mentioned iodine and/or bromine weight content.

According to a second preferred embodiment, the iodine and/or bromine cure sites are comprised as terminal groups of the polymer ($P_C$) chain. Polymers ($P_C$) according to this embodiment are generally obtained by addition to the polymerization medium during fluoroelastomer manufacture of anyone of:

iodinated and/or brominated chain-transfer agent(s); suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. No. 4,243,770 (DAIKIN IND. LTD.) and U.S. Pat. No. 4,943,622 (NIPPON MEKTRON KK.); and alkali metal or alkaline-earth metal iodides and/or bromides, such as described notably in U.S. Pat. No. 5,173,553 (AUSIMONT SRL.).

Preferred polymers ($P_C$) are those having following compositions (in mol. %):
(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%;
(ii) vinylidene fluoride (VDF) 50-80%, perfluoroalkyl vinyl ethers (PAVE) 5-50%, tetrafluoroethylene (TFE) 0-20%, bis-olefin (OF) 0-5%;
(iii) vinylidene fluoride (VDF) 20-30%, $C_2$-$C_8$ non-fluorinated olefins (OI) 10-30%, hexafluoropropene (HFP) and/or perfluoroalkyl vinyl ethers (PAVE) 18-27%, tetrafluoroethylene (TFE) 10-30%, bis-olefin (OF) 0-5%; tetrafluoroethylene (TFE) 50-80%, perfluoroalkyl vinyl ethers (PAVE) 20-50%, bis-olefin (OF) 0-5%;
(iv) tetrafluoroethylene (TFE) 45-65%, $C_2$-$C_8$ non-fluorinated olefins (OI) 20-55%, vinylidene fluoride 0-30%, bis-olefin (OF) 0-5%;
(v) tetrafluoroethylene (TFE) 32-60% mol %, $C_2$-$C_8$ non-fluorinated olefins (OI) 10-40%, perfluoroalkyl vinyl ethers (PAVE) 20-40%, fluorovinyl ethers (MOVE) 0-30%, bis-olefin (OF) 0-5%;
(vi) tetrafluoroethylene (TFE) 33-75%, perfluoroalkyl vinyl ethers (PAVE) 15-45%, vinylidene fluoride (VDF) 5-30%, hexafluoropropene HFP 0-30%, bis-olefin (OF) 0-5%;
(vii) vinylidene fluoride (VDF) 35-85%, fluorovinyl ethers (MOVE) 5-40%, per-fluoroalkyl vinyl ethers (PAVE) 0-30%, tetrafluoroethylene (TFE) 0-40%, hexa-fluoropropene (HFP) 0-30%, bis-olefin (OF) 0-5%;
(viii) tetrafluoroethylene (TFE) 20-70%, fluorovinyl ethers (MOVE) 30-80%, per-fluoroalkyl vinyl ethers (PAVE) 0-50%, bis-olefin (OF) 0-5%.

More preferred polymers ($P_C$) are those comprising vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%.

Advantageously, the method of the present invention comprises polymerizing 1,1-difluoroethylene in the presence of a redox-initiating system [system (R)] comprising at least one organic radical initiator and at least one composition [composition (CS)] comprising at least one compound [compound (S)] bearing at least one sulfinic acid group, and optionally further ingredients.

Preferably, said organic radical initiator is selected in the group comprising, more preferably consisting of: acetylcyclohexanesulfonyl peroxide; diacetyl-peroxydicarbonate; dialkylperoxydicarbonates such as diethylperoxydicarbonate, dicyclohexylperoxydicarbonate, di-2-ethylhexylperoxydicarbonate; tertbutyl-pemeodecanoate; 2,2'-azobis(4-methoxy-2,4dimethylvaleronitrile); tertbutyl-perpivalate; dioctanoylperoxide; dilauroyl-peroxide; 2,2'-azobis (2,4-dimethyl-valeronitrile); tert-butylazo-2-cyanobutane; dibenzoylperoxide; tertbutyl-per-2-ethylhexanoate; tert-butylpermaleate; 2,2'-azobis(isobutyronitrile); bis(tertbutyl-peroxy)-cyclohexane; tert-butyl-peroxyisopropylcarbonate; tertbutylperacetate; 2,2'-bis (tert-butylperoxy)butane; dicumyl peroxide; di-tertamyl peroxide; di-tert-butyl peroxide; p-methane hydroperoxide; pinnae hydroperoxide; cumene hydro-peroxide; disuccinylperoxide; and tert-butyl hydroperoxide. Organic radical initiator selected from peroxides are particularly preferred.

Preferably, said organic radical initiator is used at a concentration ranging from 0.001 to 20 wt. % based on the total weight of the polymerization medium.

Preferably, said compound (S) complies with the following formula (S—I):

(S-I)

wherein
M is a hydrogen atom, an ammonium ion, a monovalent metal ion;
R20 is —OH or —N($R^4$)($R^5$) where each of $R^4$ and $R^5$, identical or different from one another, are hydrogen atom or linear or branched alkyl chain having from 1 to 6 carbon atoms;
R21 is hydrogen atom, linear or branched alkyl group having from 1 to 6 carbon atoms, 5- or 6-membered cycloalkyl group, 5- or 6-membered aryl group;

R22 is —COOM, —SO$_3$M, —C(=O)R$^4$, —C(=O)N(R$^4$)(R$^5$), —C(=O)OR$^4$, wherein M, R$^4$ and R$^5$ are as defined above,
and salt thereof with at least one monovalent metal ion.

Preferably, M is hydrogen atom or a monovalent metal ion.

Preferably, said monovalent metal ion is selected from sodium and potassium.

Preferably, R20 is selected from hydroxyl or amino group.

Preferably, R21 is selected from hydrogen atom, linear or branched alkyl group having from 1 to 3 carbon atoms, and 5- or 6-membered aryl group.

Preferably, R22 is selected from —COOM, —SO$_3$M, and C(=O)OR$^4$, wherein M, R$^4$ and R$^5$ are as defined above.

A preferred compound (S) complies with formula (S—I) above, wherein M is sodium, R20 is —OH, R21 is hydrogen atom and R22 is selected from —COOM, —SO$_3$M, and C(=O)OR$^4$, wherein M, R$^4$ and R$^5$ are as defined above.

A more preferred compound (S) complies with formula (S—I) above, wherein M is sodium, R20 is —OH, R21 is hydrogen atom and R22 is —COOM, with M being sodium.

Preferably, said composition (CS) comprises at least 40 wt. % of a compound complying with formula (S—I) as defined above, with respect to the total weight of said composition (CS).

Preferably, said composition (CS) comprises at most 79 wt. % of a compound complying with formula (S—I) as defined above, with respect to the total weight of said composition (CS).

Preferably, said composition (CS) further comprises sulphurous acid or a salt thereof (also referred to as "sulfite"), such as notably sodium sulphite.

Preferably, said composition (CS) comprises at least 20 wt. % of said sulphurous acid or a salt thereof, with respect to the total weight of said composition (CS).

Preferably, said composition (CS) comprises at most 40 wt. % of said sulphurous acid or a salt thereof, with respect to the total weight of said composition (CS).

Preferably, said composition (CS) further comprises a compound [compound (S$_3$) comprising at least one sulfonic acid group.

Preferably, said compound (S$_3$) complies with the following formula (S$_3$—I):

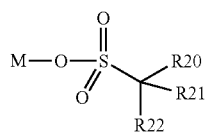

(S$_3$-I)

wherein M, R20, R21 and R22 have the same meaning defined above for compound of formula (S—I),
and salt thereof with at least one monovalent metal ion.

Preferably, said composition (CS) comprises at least 1 wt. % of a compound complying with formula (S$_3$—I) as defined above, with respect to the total weight of said composition (CS).

Preferably, said composition (CS) comprises at most 40 wt. % of a compound complying with formula (S$_3$—I) as defined above, with respect to the total weight of said composition (CS).

Suitable examples of said composition (CS) and compound (S) are commercially available from BRÜGGEMANN-GROUP under the trade name Bruggolite®.

The method according to the present invention further comprises the use of further ingredients known in the art, such as typically surfactant(s), chain transfer agent(s) and accelerant(s).

Preferably, said surfactant is selected from fluorinated surfactants, such as notably those complying with the following formula:

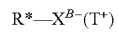

wherein
R* is a C$_5$-C$_{16}$ (per)fluoroalkyl chain or a (per)fluoropolyoxyalkylenic chain,
X$^{B-}$ is —COO$^-$ or —SO$_3^-$,
T$^+$ is selected from: H$^+$, NH$_4^+$, an alkaline metal ion.

Preferred surfactants are notably selected from the group comprising fluorinated surfactants, such as notably: ammonium perfluoro-octanoate; (per)fluoropolyoxy-alkylenes ended with one or more carboxylic groups, optionally salified with sodium, ammonium and alkaline metals, more preferably salified with sodium; and partially fluorinated alkylsulphonates.

Preferably, said surfactant is used in an amount of from 0.05 to 5 wt. % based on the total weight of the final polymer (P).

According to an alternative embodiment, the method of the present invention is performed in the absence of said surfactant or said surfactant(s) is(are) used in an amount not exceeding 100 ppm, more preferably not exceeding 50 ppm, with respect to the total weight of the final polymer (P).

Preferably, said chain transfer agent is selected from ketones, esters, ethers or aliphatic alcohols having from 3 to 10 carbon atoms, such as acetone, ethylacetate, diethylether, methyl-ter-butyl ether, isopropyl alcohol, etc.; chloro(fluoro)carbons, optionally containing hydrogen, having from 1 to 6 carbon atoms, such as chloroform, trichlorofluoromethane; bis(alkyl)carbonates wherein the alkyl has from 1 to 5 carbon atoms, such as bis(ethyl)carbonate, bis(isobutyl)-carbonate. The chain transfer agent can be fed to the polymerization medium at the beginning, continuously or in discrete amounts (step-wise) during the polymerization, continuous or stepwise feeding being preferred.

Preferably, said accelerant is selected from the group comprising, more preferably consisting of: organic onium compounds, amino-phosphonium derivatives, phosphoranes and imine compounds.

Examples of accelerants that may be used include: quaternary ammonium or phosphonium salts as notably described in EP 335705 A (MINNESOTA MINING) and U.S. Pat. No. 3,876,654 (DUPONT); aminophosphonium salts as notably described in U.S. Pat. No. 4,259,469 (MONTEDISON S.P.A.); phosphoranes as notably described in U.S. Pat. No. 3,752,787 (DUPONT); imine compounds as described in EP 0120462 A (MONTEDISON S.P.A.) or as described in EP 0182299 A (ASAHI CHEMICAL)

Quaternary phosphonium salts and aminophosphonium salts are preferred, and more preferably salts of tetrabutylphosphonium, tetrabutyl ammonium, and of 1,1-diphenyl-1-benzyl-N-diethyl-phosphoramine of formula:

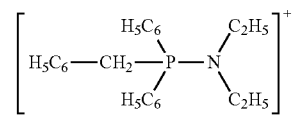

Said accelerant is preferably used in an amount from 0.05 phr and up to 10 phr, based on the total weight of polymer (P).

Further to the above, the method of the present invention is performed using other conventional additives, such as reinforcing fillers (e.g., carbon black), thickeners, pigments, antioxidants, stabilizers and the like.

Advantageously, the method of the present invention comprises polymerizing 1,1-difluoroethylene with at least one further monomer (MF) as defined above, in an aqueous emulsion in the presence of system (R) as defined above, and optionally further ingredients.

Preferably, said further ingredients are selected from surfactant(s), chain transfer agent(s) and accelerant(s), as defined above.

The method according to the present invention can be preferably performed in continuous, or semi-batch or batch.

The method of the present invention is performed at a temperature that can be selected from the person skilled in the art, notably on the basis of the organic peroxide. Preferably, the method of the present invention is performed at a temperature from 40° C. to 120° C., more preferably from 50° C. to 100° C.

The method of the present invention is preferably performed at a pressure between 10 and 60 bars, more preferably from 25 to 55 bars.

In a further aspect, the present invention also relates to an article made from a composition comprising at least polymer (P) as defined above.

Said articles can be notably selected from pipes, joints, O-rings, hoses, and the like.

In a further aspect, the present invention relates to a method for the manufacture of shaped article, said method comprising processing a composition comprising at least polymer (P) as defined above.

Said polymer (P) can be fabricated, e.g. by moulding (injection moulding, extrusion moulding), calendering, or extrusion, into the desired shaped article. If necessary, the article is then subjected to vulcanization (or curing) during the processing itself and/or in a subsequent step (post-treatment or post-cure).

Should the disclosure of any patents, patent applications, and publications which are incorporated herein by reference conflict with the description of the present application to the extent that it may render a term unclear, the present description shall take precedence.

The present invention will be now described in more detail with reference to the following examples, whose purpose is merely illustrative and not limitative of the scope of the invention.

EXPERIMENTAL SECTION

Materials:
Bruggolite® type TP1328 (2-hydroxy-2-sulfinatoacetic acid disodium salt) was obtained from Brugemann® and used as such.
Methods:
The number of branches (No. branches) is calculated according to the following formula:

No. branches=[(No. of measured CE)−(No. of theoretical CE)]×Mn×10$^{-6}$ wherein
"No. of measured CE" is the total number of the chain ends, measured by NMR on the polymer;
"No. of theoretical CE" is the total number of the chain ends, calculated as follows: $(2\times10^6)/M_n$; and
$M_n$ is the number average molecular weight of the polymer, as measured by GPC.

The number average molecular weight ($M_n$) was determined by GPC using the following conditions:
for VDF co-polymers: THF was used as solvent, against a calibration curve based on polystyrene monodisperse standards having molecular weight from 1700 to 4000000. Details of the GPC conditions are listed hereinafter:
Mobile phase Tetrahydrofuran; Flow rate 1.0 mL/min; Temperature 35° C.; Injection system Autosampler model 717 plus; Injection volume 200 µl; Pump Isocratic Pump model 515; Column set: Precolumn+4 Agilent PL Gel: $10^6$, $10^5$, $10^4$ and $10^3$ ÅDetector Waters Refractive Index model 2414; Software for data acquisition and processing Waters Empower 3.
for VDF homopolymers (PVDF): Eluent DMA+LiBr 0.01N. Flux: 1 mL/min; Solution concentration about 0.25% w/v in DMA+LiBr 0.01N; Pump Waters Isocratic Pump model 515; Injection system Waters 717plus Autosampler. Injection volume 200 µl; Columns Four Water Styragel HT (300×7.5) mm, 10 µm particle size—Styragel HT-6, HT-5, HT-4, HT-3 with guard column—T guard column and columns: 45° C.; Detector Waters refractive index model 2414. T detector: 45° C.; Calibration with standard polystyrene.

Example 1—Manufacture of a VDF/HFP Copolymer with the Redox-Initiating System According to the Invention In a 21 L horizontal autoclave, equipped with stirrer working at 60 rpm, were introduced after evacuation 10.5 L of demineralized water and 113 mL of a micro-emulsion prepared following the procedure described in Example 1 of U.S. Pat. No. 7,122,608 (SOLVAY SOLEXIS S.P.A.). The autoclave was then heated to 60° C. and maintained at such temperature for the entire duration of the reaction. Then, 500 ml (aqueous solution at concentration 5.9 wt. %) of ethyl acetate transfer agent were introduced. The pressure of the autoclave was increased by feeding HFP monomer, until the delta pressure reaches 11.4 bar. A gaseous mixture of the following monomers was fed to the autoclave so as to bring the pressure to 37 bar: vinylidene fluoride (VDF) 52% by moles and hexafluoropropene (HFP) 48% by moles. A 2.2 wt. % solution of t-butyl hydroperoxide in demineralized water was pumped in the autoclave at a speed of 75 mL/h. Simultaneously, but separately, 1.5 wt. % of Bruggolite® type TP1328 in distilled water was pumped in the autoclave at the same speed. A pressure of 37 bar was maintained constant during polymerization by feeding a mixture consisting of the following monomers: VDF (78.5% by moles) and HFP (21.5% by moles).

The polymerization was continued until reaching overall monomer consumption of 4800 g after 202 minutes, then the autoclave was depressurized, vented and cooled.

A latex having a solid content of 28.3% by weight was obtained of a copolymer having the following molar monomer composition: 79.4% by mol of VDF and 20.6% by mol of HFP.

The latex was coagulated with aluminium sulphate, following standard conditions.

The monomer composition and chain ends characterization, detected by NMR are provided in Table 1. Molecular weight as detected by Gel permeation chromatography (GPC) of the obtained fluoroelastomer is provided in Table 2.

Example 2C(*)—Comparative—Manufacture of a VDF/HFP Copolymer with a Redox-Initiating System Comprising t-Butyl Hydroperoxide and Ascorbic Acid In a 21 l horizontal autoclave, equipped with stirrer working at 60 rpm, were introduced after evacuation 10.5 L of demineralized water and 113 ml of a micro-emulsion prepared following the procedure described in Example 1 of U.S. Pat. No. 7,122,608 (SOLVAY SOLEXIS S.P.A.). The autoclave was then heated to 60° C. and maintained at such temperature for the entire duration of the reaction. Then 517 ml (aqueous solution at concentration 5.9 wt. %) of ethyl acetate transfer agent were introduced. A gaseous mixture of the following monomers was fed to the autoclave so as to bring the pressure to 37 bar: vinylidene fluoride (VDF) 48% by moles and hexafluoropropene (HFP) 52% by moles. A 2.0 wt. % solution of t-butyl hydro-peroxide in demineralized water was pumped in the autoclave at a speed of 75 mL/h. Simultaneously, but separately, a 2.0 wt. % solution of L-ascorbic acid was pumped in the autoclave at the same speed. A pressure of 37 bar was maintained constant during polymerization by feeding a mixture consisting of the following monomers: VDF (71.5% by moles) and HFP (21.5% by moles).

The polymerization was continued until reaching overall monomer consumption of 4800 g after 194 minutes, then the autoclave was depressurized, vented and cooled.

A latex having a solid content of 31.2% by weight was obtained of a copolymer having the following molar monomer composition: 79.9% by mol of VDF and 20.1% by mol of HFP.

The latex was coagulated with aluminium sulphate, following standard conditions.

The monomer composition and chain ends characterization, detected by NMR are provided in Table 1. Molecular weight, detected by Gel permeation chromatography (GPC), and number of branches per chain of the obtained fluoroelastomer is provided in Table 2.

TABLE 1

| Monomer composition and chain ends characterization | | | |
|---|---|---|---|
|  |  | Example 1 | Example 2C(*) |
| VDF | % mol. | 79.4 | 79.9 |
| HFP | % mol. | 20.6 | 20.1 |
| Chain end per Kg of fluoropolymer | | | |
| (a) —$CF_2H$ | mmol/Kg | 16 | 16 |
| (b) —$CF_2CH_3$ | mmol/Kg | 9 | 10 |
| (c) —OC(=O)$CH_3$ | mmol/Kg | 3 | 4 |
| (a) + (b) + (c) | mmol/Kg | 28 | 30 |
| —$CF_2CH_2OH$ | mmol/Kg | Nd. | Nd. |

(*)comparison
Nd. = not detectable (lower than the limit of detection, i.e., lower than 0.05 mmol/Kg)

TABLE 2

| GPC analysis | | |
|---|---|---|
|  | Example 1 | Example 2C(*) |
| Number average molecular weight (Mn) | 110 443 | 125 714 |
| Number of branches per chain | 1.1 | 1.8 |

(*)comparison

Example 3—Manufacture of a PVDF Homo-Polymer with the Redox-Initiating System According to the Invention In a 21 L horizontal autoclave, equipped with stirrer working at 60 rpm, were introduced, after evacuation 13.8 L of demineralized water and 76 g of micro-emulsion prepared following the procedure described in Example 1 of U.S. Pat. No. 7,122,608 (SOLVAY SOLEXIS S.P.A.).

While the autoclave was heated to 70° C., 583 ml of a 5.6 wt. % solution of ethyl acetate were pumped into the reactor. The reactor was pressurized up to 50 bar by feeding VDF. When the addition of ethylacetate was completed, a 2.2 wt. % solution of t-butyl hydroperoxide in demineralized water was pumped in the autoclave at a speed of 75 mL/h. Simultaneously, but separately, a 1.5 wt. % of Bruggolite® in demineralized water was pumped in the autoclave at the same speed. A pressure of 50 bar was maintained constant during polymerization by feeding VDF.

The polymerization was continued until reaching overall monomer consumption of 4500 g after 318 min, then the autoclave was depressurized, vented and cooled.

A homopolymer PVDF latex having a solid content of 24.5% by weight was obtained, together with 400 g of coagulated PVDF.

The monomer composition and chain ends characterization, detected by NMR are provided in Table 3. Molecular weight, detected by Gel permeation chromatography (GPC), and number of branches per chain of the obtained fluoroelastomer is provided in Table 4.

Example 4C(*)—Comparative—Manufacture of a PVDF Homopolymer with a Redox-Initiating System Comprising t-Butyl Hydroperoxide and Ascorbic Acid In a 21 L horizontal autoclave equipped with stirrer working at 60 rpm, were introduced, after evacuation, 13.8 L of demineralized water and 76 g of a micro-emulsion prepared following the procedure described in Example 1 of U.S. Pat. No. 7,122,608 (SOLVAY SOLEXIS S.P.A.). While the autoclave was heated to 70° C., 583 ml of a 5.6 wt. % solution of ethyl acetate were pumped into the reactor. The reactor was pressurized up to 50 bar by feeding VDF. When the addition of ethylacetate was completed, a 2.0 wt. % solution of t-butyl hydroperoxide in demineralized water was pumped in at a speed of 75 mL/h. Simultaneously but separately, a 2.0 wt. % solution of L-ascorbic acid was pumped in at the same speed. A pressure of 50 bar was maintained constant during polymerization by feeding VDF.

The polymerization was continued until reaching overall monomer consumption of 4500 g after 215 min, then the autoclave was depressurized, vented and cooled.

A homopolymer PVDF latex having a solid content of 27 wt. % was obtained, together with 200 g of coagulated PVDF.

The monomer composition and chain ends characterization, detected by NMR are provided in Table 3. Molecular weight, detected by Gel permeation chromatography (GPC), and number of branches per chain of the obtained fluoroelastomer is provided in Table 4.

TABLE 3

Monomer composition and chain ends characterization

|  |  | Example 3 | Example 4C(*) |
|---|---|---|---|
| VDF | % mol. | 100 | 100 |
| Chain end per Kg of fluropolymer | | | |
| (a) —CF$_2$H | mmol/Kg | 17 | 25.6 |
| (b) —CF$_2$CH$_3$ | mmol/Kg | 11.3 | 13.8 |
| (c) —CH$_2$CH$_3$ + —C(CH$_3$)$_3$ | mmol/Kg | 5.8 | 5.3 |
| (a) + (b) + (c) | mmol/Kg | 34.1 | 44.7 |

(*)comparison

TABLE 4

GPC analysis

|  | Example 3 | Example 4C(*) |
|---|---|---|
| Number average molecular weight (M$_n$) | 119 000 | 115 000 |
| Number of branches per chain | 2.06 | 3.14 |

(*)comparison

The invention claimed is:

1. A method for the synthesis of a partially fluorinated polymer (P) comprising recurring units derived from 1,1-difluoroethylene, said method comprising polymerizing 1,1-difluoroethylene, optionally in the presence of at least one further (per)fluorinated monomer (MF), in an aqueous emulsion in the presence of a redox-initiating system (R) comprising at least one organic radical initiator and at least one composition (CS) comprising at least one compound (S) bearing at least one sulfinic acid group, wherein said compound (S) complies with the following formula (S—I):

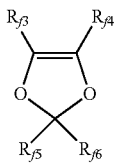

wherein
M is a hydrogen atom, an ammonium ion, or a monovalent metal ion;
R20 is —OH or —N(R$^4$)(R$^5$) where each of R$^4$ and R$^5$, identical or different from one another, are a hydrogen atom or a linear or branched alkyl chain having from 1 to 6 carbon atoms;
R21 is a hydrogen atom, a linear or branched alkyl group having from 1 to 6 carbon atoms, a 5- or 6-membered cycloalkyl group, or a 5-or 6-membered aryl group;
R22 is —COOM, —SO$_3$M, —C(=O)R$^4$, —C(=O)N(R$^4$)(R$^5$), or —C(=O)OR$^4$, wherein M, R$^4$ and R$^5$ are as defined above.

2. The method according to claim 1, wherein said polymer (P) is a homo-polymer of 1,1-difluoroethylene [polymer (P$_H$)].

3. The method according to claim 1, wherein said polymer (P) is a co-polymer of 1,1-difluoroethylene [polymer (Pc)], which comprises recurring units derived from 1,1-difluoroethylene and recurring units derived from at least one further (per)fluorinated monomer (MF).

4. The method according to claim 3, wherein said polymer (Pc) comprises at least 15% moles of recurring units derived from 1,1-difluoroethylene with respect to all recurring units of said polymer (Pc).

5. The method according to claim 4, wherein said polymer (Pc) comprises at least 35% moles of recurring units derived from 1,1-difluoroethylene with respect to all recurring units of said polymer (Pc).

6. The method according to claim 3, wherein said polymer (Pc) comprises at most 85% moles of recurring units derived from 1,1-difluoroethylene with respect to all recurring units of said polymer (Pc).

7. The method according to claim 6, wherein said polymer (Pc) comprises at most 78% moles of recurring units derived from 1,1-difluoroethylene with respect to all recurring units of said polymer (Pc).

8. The method according to claim 3, wherein said monomer (MF) is selected from the group consisting of:
(a) C$_2$-C$_8$ perfluoroolefins;
(b) hydrogen-containing C$_2$-C$_8$ olefins different from vinylidene fluoride (VDF);
(c) C$_2$-C$_8$ chloro and/or bromo and/or iodo-fluoroolefins;
(d) (per)fluoroalkylvinylethers (PAVE) of formula CF$_2$=CFOR$_f$, wherein R$_f$ is a C$_1$-C$_6$ (per)fluoroalkyl group;
(e) (per)fluoro-oxy-alkylvinylethers of formula CF$_2$=CFOX, wherein X is a C$_1$-C$_{12}$ [(per)fluoro]-oxyalkyl comprising catenary oxygen atoms;
(f) (per)fluorodioxoles having formula:

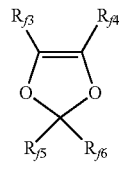

wherein R$_{f3}$, R$_{f4}$, R$_{f5}$, R$_{f6}$, equal or different from each other, are independently selected from fluorine atoms and C$_1$-C$_6$ (per)fluoroalkyl groups, optionally comprising one or more than one oxygen atom; and
(g) (per)fluoro-methoxy-vinylethers (MOVE) having formula: CFX$_2$=CX$_2$OCF$_2$OR''$_f$ wherein R''$_f$ is selected from linear or branched C$_1$-C$_6$ (per)fluoroalkyls; C$_5$-C$_6$ cyclic (per)fluoroalkyls; and C$_2$-C$_6$ (per)fluorooxyalkyls, linear or branched, comprising from 1 to 3 catenary oxygen atoms, and X$_2$ is F or H.

9. The method according to claim 8, wherein said monomer (MF) is selected from the group consisting of:
(a) tetrafluoroethylene (TFE), hexafluoropropylene (HFP);
(b) vinyl fluoride (VF), trifluoroethylene (TrFE), perfluoroalkyl ethylenes of formula CH$_2$=CH—R$_f$, wherein R$_f$ is a C$_1$-C$_6$ perfluoroalkyl group;
(c) chlorotrifluoroethylene (CTFE);

(d) (per)fluoroalkylvinylethers (PAVE) of formula $CF_2$=$CFOR_f$, wherein $R_f$ is —$CF_3$, —$C_2F_5$, or —$C_3F_7$;

(e) (per)fluoro-oxy-alkylvinylethers of formula $CF_2$=CFOX, wherein X is a perfluoro-2-propoxypropyl group;

(f) (per)fluorodioxoles having formula:

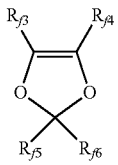

wherein $R_{f3}$, $R_{f4}$, $R_{f5}$, $R_{f6}$, equal or different from each other, are independently selected from fluorine atoms, —$CF_3$, —$C_2F_5$, —$C_3F_7$, —$OCF_3$, or —$OCF_2CF_2OCF_3$; and (g) (per)fluoro-methoxy-vinylethers (MOVE) having formula:

$CFX_2$=$CX_2OCF_2OR''_f$ wherein $X_2$ is F and $R''_f$ is —$CF_2CF_3$; —$CF_2CF_2OCF_3$; or —$CF_3$.

10. The method according to claim 1, wherein said organic radical initiator is selected from the group consisting of: acetylcyclohexanesulfonyl peroxide; diacetyl-peroxydicarbonate; dialkyl-peroxydicarbonates; tertbutyl-perneodecanoate; 2,2'-azobis(4-methoxy-2,4dimethylvaleronitrile); tertbutyl-peroxypivalate; dioctanoyl-peroxide; dilauroyl-peroxide; 2,2'-azobis (2,4-dimethyl-valeronitrile); tertbutyl-azo-2-cyanobutane; dibenzoylperoxide; tertbutyl-peroxy-2-ethylhexanoate; tert-butylperoxymaleate; 2,2'-azobis(isobutyronitrile); bis(tertbutyl-peroxy)-cyclohexane; tert-butyl-peroxyisopropylcarbonate; tertbutyl peracetate; 2,2'-bis (tertbutyl-peroxy)butane; dicumyl peroxide; di-tertamyl peroxide; di-tert-butyl peroxide; p-methane hydroperoxide; pinane hydroperoxide; cumene hydro-peroxide; disuccinylperoxide; and tert-butyl hydroperoxide.

11. The method according to claim 1, wherein said organic radical initiator is used at a concentration ranging from 0.001 to 20 wt % based on a total weight of the polymerization medium.

12. The method according to claim 1, wherein said composition (CS) comprises at least 40 wt % and at most 79 wt % of the compound complying with formula (S—I), with respect to a total weight of said composition (CS).

13. The method according to claim 1, wherein said composition (CS) further comprises sulphurous acid or a salt thereof and/or a compound ($S_3$) comprising at least one sulfonic acid group.

14. The method according to claim 13, wherein said compound ($S_3$) complies with the following formula ($S_3$—I):

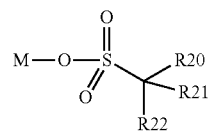

(S$_3$-I)

wherein:

M is a hydrogen atom, an ammonium ion, or a monovalent metal ion;

R20 is —OH or —N($R^4$)($R^5$) where each of $R^4$ and $R^5$, identical or different from one another, are hydrogen atom or linear or branched alkyl chain having from 1 to 6 carbon atoms;

R21 is hydrogen atom, linear or branched alkyl group having from 1 to 6 carbon atoms, 5- or 6-membered cycloalkyl group, or a 5-or 6-membered aryl group;

R22 is —COOM, —$SO_3M$, —C(=O)$R^4$, —C(=O)N($R^4$)($R^5$), or —C(=O)$OR^4$, wherein M, $R^4$ and $R^5$ are as defined above.

15. A polymerization reaction system comprising:

1,1-difluoroethylene, optionally in the presence of at least one further (per)fluorinated monomer (MF); and a redox-initiating system comprising a composition (CS) comprising at least one compound (S) bearing at least one sulfinic acid group, wherein said compound (S) complies with the following formula (S—I):

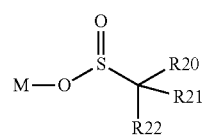

(S-I)

wherein

M is a hydrogen atom, an ammonium ion, or a monovalent metal ion;

R20 is —OH or —N($R^4$)($R^5$) where each of $R^4$ and $R^5$, identical or different from one another, are a hydrogen atom or a linear or branched alkyl chain having from 1 to 6 carbon atoms;

R21 is a hydrogen atom, a linear or branched alkyl group having from 1 to 6 carbon atoms, a 5- or 6-membered cycloalkyl group, or a 5-or 6-membered aryl group;

R22 is —COOM, —$SO_3M$, —C(=O)$R^4$, —C(=O)N($R^4$)($R^5$), or —C(=O)$OR^4$, wherein M, $R^4$ and $R^5$ are as defined above.

* * * * *

UNITED STATES PATENT AND TRADEMARK OFFICE
CERTIFICATE OF CORRECTION

PATENT NO. : 11,180,592 B2
APPLICATION NO. : 16/627752
DATED : November 23, 2021
INVENTOR(S) : Liubov Chernysheva et al.

Page 1 of 1

It is certified that error appears in the above-identified patent and that said Letters Patent is hereby corrected as shown below:

In the Claims

At Column 15, Claim number 1, Line number 45, the formula:

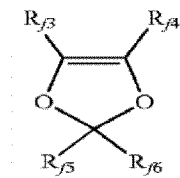

Should read:

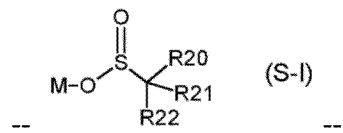

Signed and Sealed this
Seventeenth Day of May, 2022

Katherine Kelly Vidal
*Director of the United States Patent and Trademark Office*